United States Patent
Bhaskar et al.

(10) Patent No.: US 11,809,851 B2
(45) Date of Patent: Nov. 7, 2023

(54) SYSTEM AND METHOD FOR MANAGING UPDATE INSTALLATION LOCKDOWN POLICIES FOR FIRMWARE DEVICES AND DRIVER-MANAGED DEVICES

(71) Applicant: Dell Products L.P., Round Rock, TX (US)

(72) Inventors: Anusha Bhaskar, Bengaluru (IN); Santosh Gore, Bangalore (IN); Muniswamy Setty, Bengaluru (IN); Parmeshwr Prasad, Bangalore (IN); Chandrashekar Nelogal, Round Rock, TX (US)

(73) Assignee: DELL PRODUCTS L.P., Round Rock, TX (US)

( * ) Notice: Subject to any disclaimer, the term of this patent is extended or adjusted under 35 U.S.C. 154(b) by 15 days.

(21) Appl. No.: 17/386,449

(22) Filed: Jul. 27, 2021

(65) Prior Publication Data

US 2022/0398088 A1    Dec. 15, 2022

(30) Foreign Application Priority Data

Jun. 10, 2021  (IN) .............................. 202111025909

(51) Int. Cl.
G06F 8/65    (2018.01)

(52) U.S. Cl.
CPC ..................................... G06F 8/65 (2013.01)

(58) Field of Classification Search
CPC ....................................................... G06F 8/65
See application file for complete search history.

(56) References Cited

U.S. PATENT DOCUMENTS

| | | | | |
|---|---|---|---|---|
| 8,874,922 B2* | 10/2014 | Jaber | ...................... | G06F 21/572 |
| | | | | 713/153 |
| 9,507,581 B2* | 11/2016 | Butcher | ............... | G06F 9/4416 |
| 10,996,942 B1* | 5/2021 | Bisa | ...................... | G06F 9/4812 |
| 2009/0094421 A1* | 4/2009 | Lewis | ..................... | G06F 21/78 |
| | | | | 711/E12.091 |
| 2011/0093690 A1* | 4/2011 | Vyssotski | ............. | G06F 9/4406 |
| | | | | 714/E11.023 |
| 2011/0296404 A1* | 12/2011 | Zhang | ..................... | G06F 8/658 |
| | | | | 717/178 |
| 2013/0132700 A1* | 5/2013 | Liu | ......................... | G06F 8/654 |
| | | | | 711/170 |
| 2014/0068585 A1* | 3/2014 | Young | .................. | G06F 21/572 |
| | | | | 717/168 |
| 2016/0342477 A1* | 11/2016 | Swierk | ................ | G06F 11/1417 |
| 2017/0255567 A1* | 9/2017 | Vidyadhara | ............. | G06F 13/42 |
| 2017/0293520 A1* | 10/2017 | Onniyil | ............... | G06F 11/0745 |
| 2018/0136928 A1* | 5/2018 | Downum | ................ | G06F 8/654 |

(Continued)

Primary Examiner — Lewis A Bullock, Jr.
Assistant Examiner — Theodore E Hebert
(74) Attorney, Agent, or Firm — Chamberlain, Hrdlicka, White, Williams & Aughtry

(57) ABSTRACT

A method for managing a resource system includes obtaining, by a hardware resource manager, a firmware update lockdown request for a lockdown for a firmware device of the resource system, in response to the firmware update lockdown request: identifying a firmware protocol corresponding to the firmware device, generating a firmware lockdown command corresponding to the firmware device based on the firmware protocol, and initiating updating of a lockdown policy based on the firmware lockdown command.

12 Claims, 8 Drawing Sheets

(56) References Cited

U.S. PATENT DOCUMENTS

| | | | | |
|---|---|---|---|---|
| 2020/0310788 A1* | 10/2020 | Zimmer | ............... | G06F 8/65 |
| 2021/0303287 A1* | 9/2021 | Wiginton | ............... | G06F 8/65 |
| 2022/0137982 A1* | 5/2022 | Samuel | ............... | G06F 9/4401 |
| | | | | 713/2 |

* cited by examiner

SYSTEM AND METHOD FOR MANAGING UPDATE INSTALLATION LOCKDOWN POLICIES FOR FIRMWARE DEVICES AND DRIVER-MANAGED DEVICES

BACKGROUND

Computing devices in a system may include any number of internal components such as processors, memory, and persistent storage. The storage of data across multiple computing devices may require significant use of such internal components. Updates to firmware and/or operating systems operating in the computing devices may be attempted. The initiation of the updates may impact the operation of the computing devices.

SUMMARY

In general, in one aspect, the invention relates to a method for managing a resource system. The method includes obtaining, by a hardware resource manager, a firmware update lockdown request for a lockdown for a firmware device of the resource system, in response to the firmware update lockdown request: identifying a firmware protocol corresponding to the firmware device, generating a firmware lockdown command corresponding to the firmware device based on the firmware protocol, and initiating updating of a lockdown policy based on the firmware lockdown command.

In general, in one aspect, the invention relates to a non-transitory computer readable medium that includes computer readable program code, which when executed by a computer processor enables the computer processor to perform a method for managing a resource system. The method includes obtaining, by a hardware resource manager, a firmware update lockdown request for a lockdown for a firmware device of the resource system, in response to the firmware update lockdown request: identifying a firmware protocol corresponding to the firmware device, generating a firmware lockdown command corresponding to the firmware device based on the firmware protocol, and initiating updating of a lockdown policy based on the firmware lockdown command.

In general, in one aspect, the invention relates to a system that includes a processor and memory that includes instructions, which when executed by the processor, perform a method. The method includes obtaining, by a hardware resource manager, a firmware update lockdown request for a lockdown for a firmware device of the resource system, in response to the firmware update lockdown request: identifying a firmware protocol corresponding to the firmware device, generating a firmware lockdown command corresponding to the firmware device based on the firmware protocol, and initiating updating of a lockdown policy based on the firmware lockdown command.

BRIEF DESCRIPTION OF DRAWINGS

Certain embodiments of the invention will be described with reference to the accompanying drawings. However, the accompanying drawings illustrate only certain aspects or implementations of the invention by way of example and are not meant to limit the scope of the claims.

DETAILED DESCRIPTION

Specific embodiments will now be described with reference to the accompanying figures. In the following description, numerous details are set forth as examples of the invention. It will be understood by those skilled in the art that one or more embodiments of the present invention may be practiced without these specific details and that numerous variations or modifications may be possible without departing from the scope of the invention. Certain details known to those of ordinary skill in the art are omitted to avoid obscuring the description.

In the following description of the figures, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment, which may be implemented in addition to, in conjunction with, or in place of the embodiments described with regard to a corresponding like-named component in any other figure.

In general, embodiments of the invention relate to a method and system for managing updates to resources. The resources may be firmware devices or driver-managed devices. Embodiments of the invention include a hardware resource manager that manages the resources. The hardware resource manager may be operated by an administrator of one or more of the resources. The hardware resource manager may manage resource lockdown policies implemented by the resources. The resource lockdown policies may specify whether updates to the firmware and/or operating systems of the resources may be initiated by external entities (e.g., clients).

Embodiments of the invention may set a lockdown policy for a firmware device by identifying a firmware protocol corresponding to the firmware device, generating a lockdown command based on the firmware protocol, and updating the resource lockdown policy for the firmware device based on the identified firmware protocol.

Embodiments of the invention may set the lockdown policy of a driver-managed device by sending an installation prevention request to a device driver of the driver-managed device that specifies an identified set of hardware resources of the driver-managed device to be locked down.

Figure 1A:
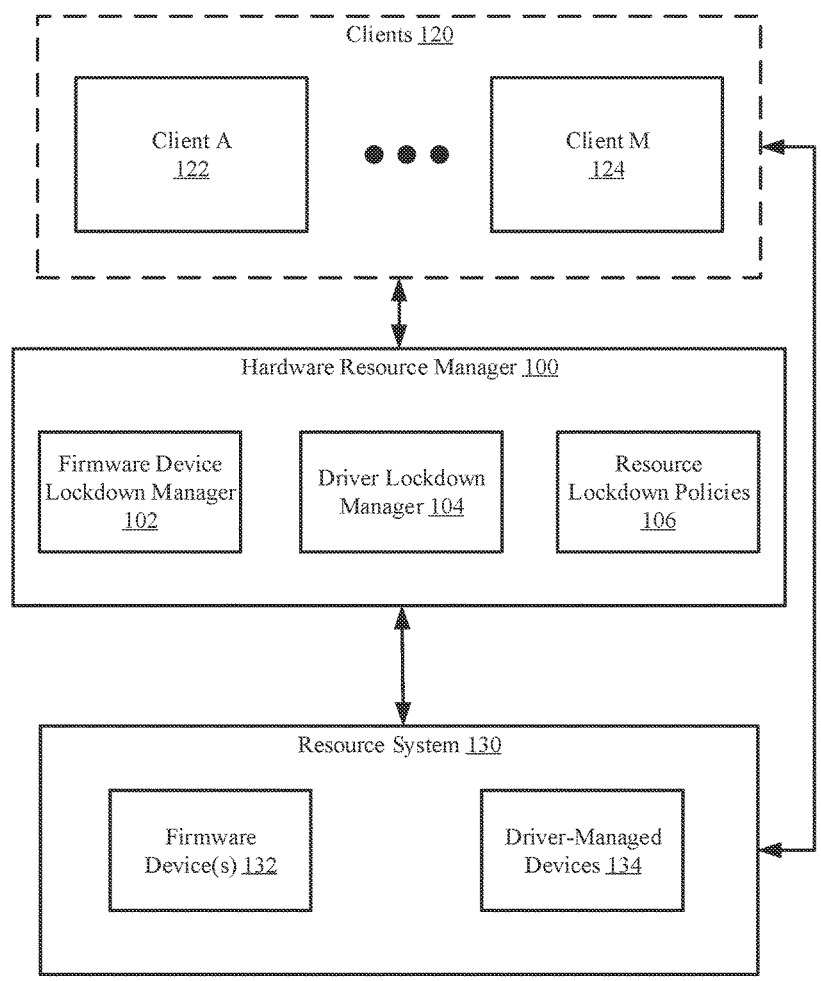
FIG. 1A shows a diagram of a system in accordance with one or more embodiments of the invention.

FIG. 1A shows an example system in accordance with one or more embodiments of the invention. The system includes a hardware resource manager (100), one or more clients (120), a resource system (130). The system may include additional, fewer, and/or different components without departing from the invention. Each component may be operably connected to any of the other components via any combination of wired and/or wireless connections. Each component illustrated in FIG. 1A is discussed below.

In one or more embodiments of the invention, the hardware resource manager (100) manages the resource system (130). Specifically, the hardware resource manager (100) manages the lockdown capability of the resources in the resource system (130). To perform the aforementioned functionality, the hardware resource manager (100) includes a firmware device lockdown manager (102), a driver lockdown manager (104), and resource lockdown policies. The hardware resource manager (100) may perform the method of FIG. 2A-2B to manage the resources. The firmware device lockdown manager (102) may perform the method of FIG. 2A; the driver lockdown manager (104) may perform the method of FIG. 2B. The resource lockdown policies (106) store the lockdown modes set for each of the resources in the resource system (130).

Figure 4:
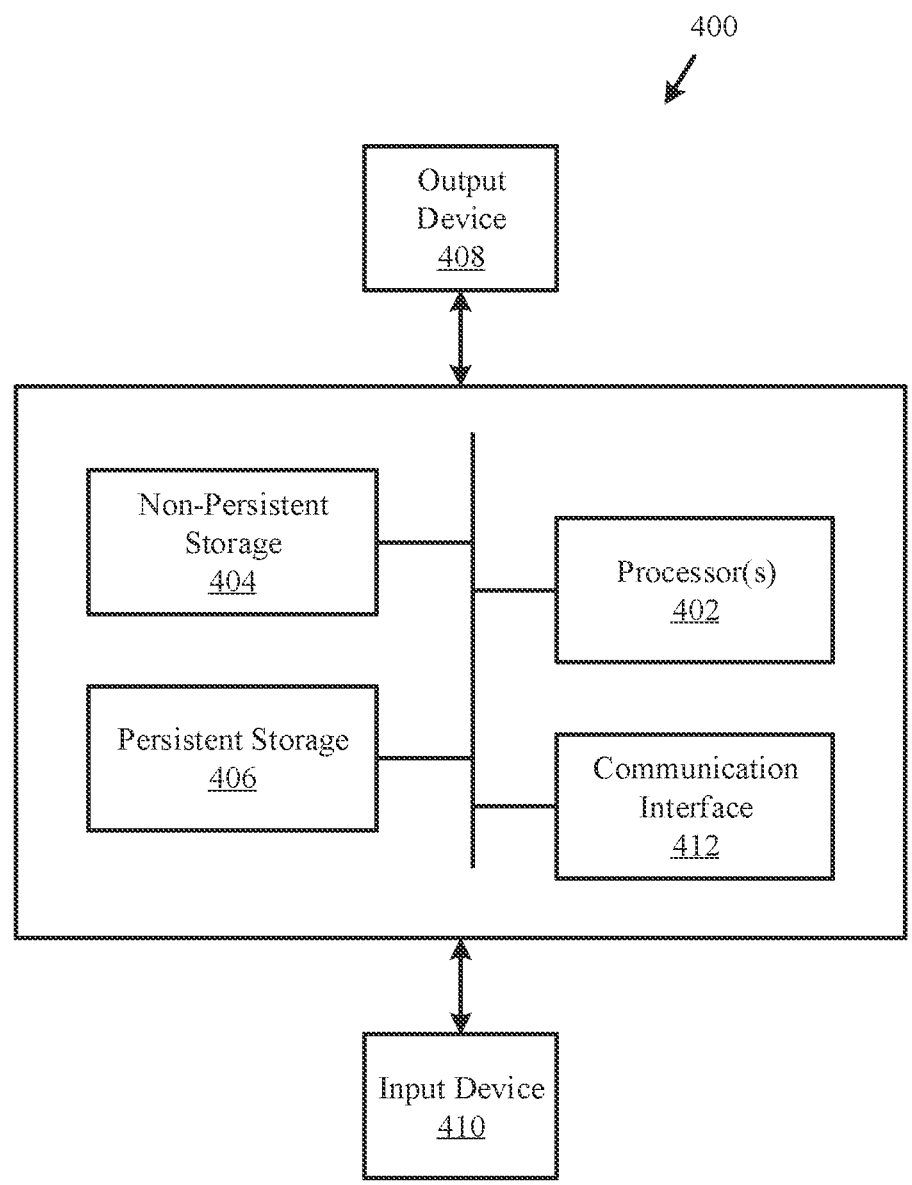
FIG. 4 shows a diagram of a computing device in accordance with one or more embodiments of the invention.

In one or more embodiments of the invention, the hardware resource manager (100) is implemented as a computing device (see e.g., FIG. 4). The computing device may be, for example, a mobile phone, a tablet computer, a laptop computer, a desktop computer, a server, a distributed computing system, or a cloud resource. The computing device may include one or more processors, memory (e.g., random access memory), and persistent storage (e.g., disk drives, solid state drives, etc.). The computing device may include instructions, stored on the persistent storage, that when executed by the processor(s) of the computing device cause the computing device to perform the functionality of the hardware resource manager (100) described throughout this application and/or all, or a portion thereof, of the methods illustrated in FIGS. 2A-2B.

In one or more embodiments of the invention, the firmware device lockdown manager (102) manages the firmware devices (132) of the resource system (130). Specifically, the firmware lockdown manager (102) initiates the lockdown mode of the firmware devices (132) to prevent the update lockdown of the firmware of the firmware devices (132). The lockdown mode of the firmware devices (132) may be initiated in accordance with FIG. 2A.

In one or more embodiments of the invention, the driver lockdown manager (104) manages the driver-managed devices (134) of the resource system (130). Specifically, the driver lockdown manager (104) initiates the lockdown mode of the driver-managed devices (134) to prevent the update lockdown of the firmware of the firmware devices (132). The lockdown mode of the firmware devices (132) may be initiated in accordance with FIG. 2B.

In one or more embodiments of the invention, the resource lockdown policies (106) (also referred to as lockdown policies) are data structures that specify the mode (e.g., lockdown mode, update-enabled mode, etc.) of the devices in the resource system (130). In one or more embodiments of the invention, the update-enabled mode of a device (e.g., a firmware device or driver-managed device) refers to a mode in which there is no lockdown policy implemented for such device. In one or more embodiments of the invention, the resource lockdown policies (106) specify the components in the corresponding devices in the resource system (130) and the corresponding lockdown mode of such devices.

In one or more embodiments of the invention, the hardware resource manager (100) is implemented as a logical device. The logical device may utilize the computing resources of any number of computing devices and thereby provide the functionality of the hardware resource manager (100) described throughout this application and/or all, or a portion thereof, of the methods illustrated in FIGS. 2A-2B.

While the hardware resource manager (100) is illustrated in FIG. 1A as being a separate entity, the hardware resource manager (100), and any components thereof, may be executed as part of the resource system (130), the backup storage system (150), the clients (120), and/or any other entities without departing from the invention.

In one or more embodiments of the invention, the resource system (130) includes devices operatively connected to each other via any combination of wired and/or wireless connections. The resources may include one or more firmware devices (132) and/or one or more driver-managed devices (134).

In one or more embodiments of the invention, the firmware devices (132) are devices that operate using updatable firmware. The firmware devices (132) may operate with or without additional software and/or operating systems without departing from the invention. The firmware devices (132) may each operate using a firmware protocol to communicate between components. For additional details regarding a firmware device, see, e.g., FIG. 1B.

In one or more embodiments of the invention, the driver-managed devices are computing devices that are equipped with a device driver. The device driver may operate in an operating system of the driver-managed devices. For additional details regarding a driver-managed device, see, e.g., FIG. 1C.

In one or more embodiments of the invention, the resource system (130) is implemented as a computing device (see e.g., FIG. 4). The computing device may be, for example, a mobile phone, a tablet computer, a laptop computer, a desktop computer, a server, a distributed computing system, or a cloud resource. The computing device may include one or more processors, memory (e.g., random access memory), and persistent storage (e.g., disk drives, solid state drives, etc.). The computing device may include instructions, stored on the persistent storage, that when executed by the processor(s) of the computing device cause the computing device to perform the functionality of the resource system (130) described throughout this application.

In one or more embodiments of the invention, the resource system (130) is implemented as a logical device. The logical device may utilize the computing resources of any number of computing devices and thereby provide the functionality of the resource system (130) described throughout this application.

In one or more embodiments of the invention, each of the backup storage systems (150) stores FBBs. The FBBs may be backups for file systems. The file systems may be based on files used by the applications (132). The FBBs may each correspond to a point in time of the file system. The FBBs may be used to restore the file system to such corresponding point in time.

In one or more embodiments of the invention, the clients (120) utilize the services provided by the resource system (130). For example, the clients (120) may utilize the hardware resources of the firmware devices (132) to execute applications. Further, the clients (120) may initiate updates to the software and/or firmware operated by the resources. The updates may be sent by the clients (120) (or other entities shown or not shown in FIG. 1A) to the resources in the resource system (130). The acceptance and initiation of the updates to their respective software and/or firmware by the resources may be based on their corresponding lockdown policies (discussed below).

Figure 1B:
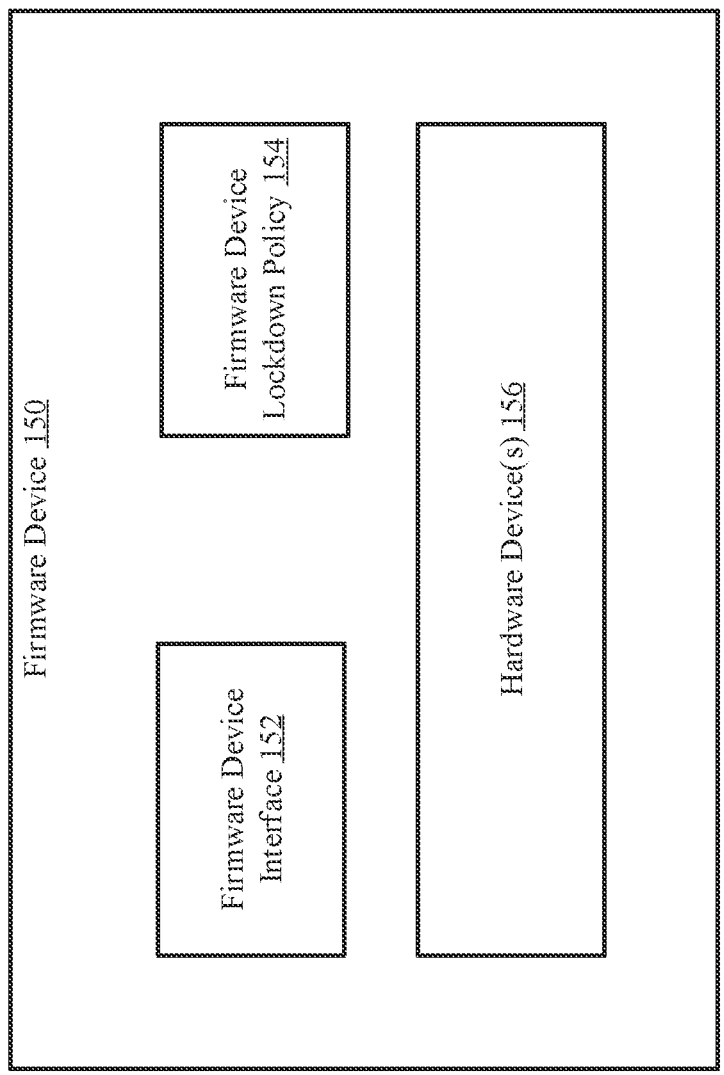
FIG. 1B shows a diagram of a firmware device in accordance with one or more embodiments of the invention.

FIG. 1B shows a diagram of a firmware device (150) in accordance with one or more embodiments of the invention. The firmware device (150) may be similar to a firmware device (132, FIG. 1A) discussed above. The firmware device (150) may include a firmware device interface (152), a firmware device lockdown policy (154), and any number of hardware devices (156). The firmware device (150) may include additional, fewer, and/or different components without departing from the invention.

In one or more embodiments of the invention, the firmware device interface (152) communicates with the hardware resource manager (100, FIG. 1A) discussed above. In one or more embodiments of the invention, the firmware device interface (152) further includes functionality for communicating with the hardware devices (156) (also referred to as hardware resources) using a firmware protocol of the firmware device. Examples of firmware protocols include, but are not limited to: a firmware management protocol (FMP), a platform-level data model (PLDM) protocol, and a non-FMP protocol. In one or more embodiments of the invention, a non-FMP protocol relates to a protocol that does not utilize the commands of the FMP protocol. Such firmware protocol may be used to communicate with the hardware resource manager (e.g., 100, FIG. 1A) discussed above.

The firmware device lockdown policy (154) may be a data structure that specifies whether each device in the hardware devices (156) is in a lockdown mode. The lockdown policy (154) of the firmware device (150) may be populated based on the firmware policy discussed above. For example, if the firmware protocol is FMP, the content of the firmware device lockdown policy (154) may specify the globally-unique identifier (GUID) of the firmware device (150).

In one or more embodiments of the invention, the hardware devices (156) provide the functionality of the firmware device. The hardware devices (156) may be implemented as, for example, a processor, a memory device (e.g., random access memory (RAM)), persistent storage, a graphics processing unit (GPU), and/or any other combination of components of a computing device (further discussed in FIG. 4).

Figure 1C:
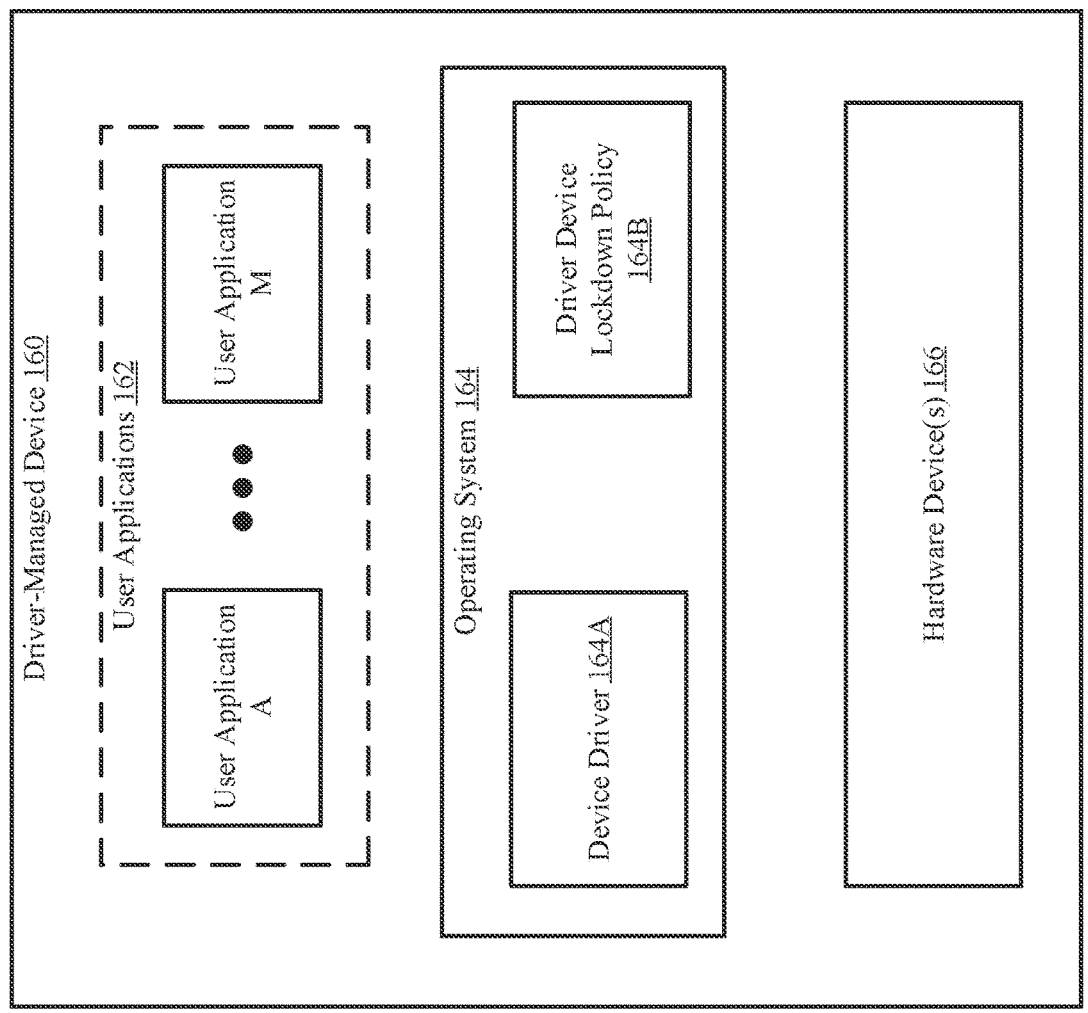
FIG. 1C shows a diagram of a driver-managed device in accordance with one or more embodiments of the invention.

FIG. 1C shows a diagram of a driver-managed device (160) in accordance with one or more embodiments of the invention. The driver-managed device (160) may be similar to a driver-managed device (134, FIG. 1A) discussed above. The driver-managed device (160) may include user applications (152), an operating system (164) that includes a device driver (164A) and a driver device lockdown policy (164B), and any number of hardware devices (166). The firmware device (150) may include additional, fewer, and/or different components without departing from the invention.

In one or more embodiments of the invention, the user applications (162) provide services to the users as discussed above. The operating system (164) may enable the operation of the user applications (162). The device driver (164A) may communicate with the hardware resource manager (100, FIG. 1A) discussed above. The driver device lockdown policy (164B) may be a data structure that specifies whether each device in the hardware devices (166) is in a lockdown mode.

In one or more embodiments of the invention, the hardware devices (166) of the driver-managed device (160) provide the functionality of the driver-managed device (160). The hardware devices (166) may be implemented as, for example, a processor, a memory device (e.g., random access memory (RAM)), persistent storage, a graphics processing unit (GPU), and/or any other combination of components of a computing device (further discussed in FIG. 4).

Figure 2A:
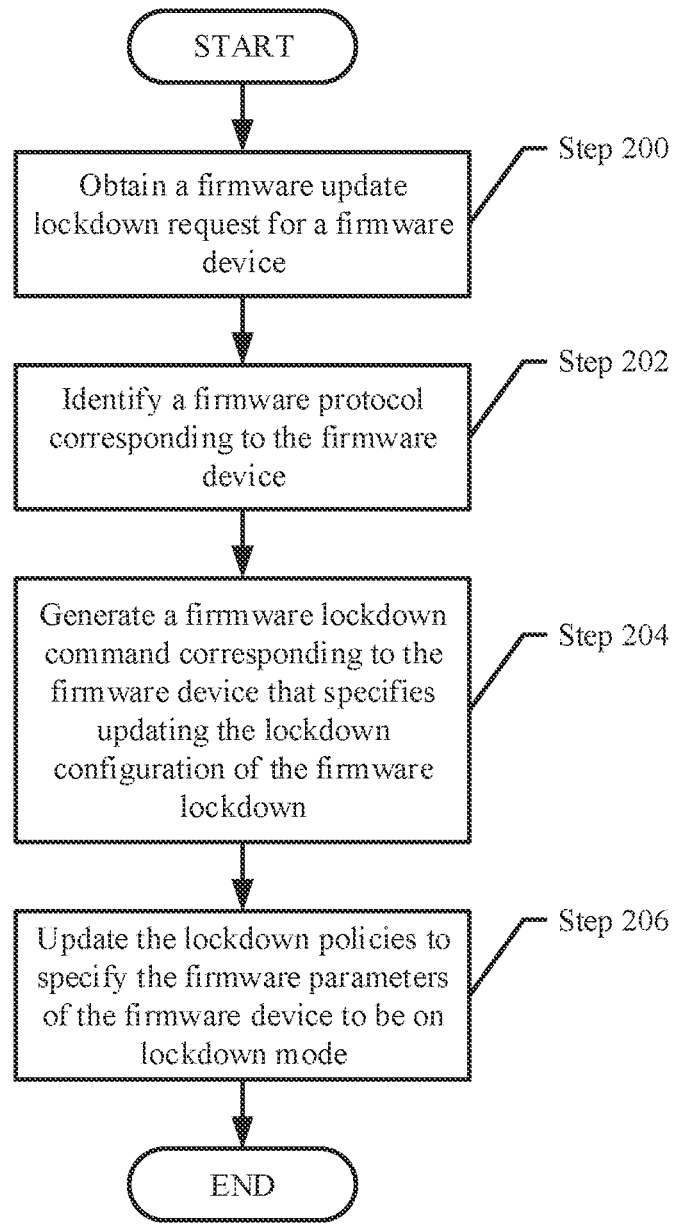
FIG. 2A shows a flowchart for managing upgrade lockdowns for firmware devices in accordance with one or more embodiments of the invention.
Figure 2B:
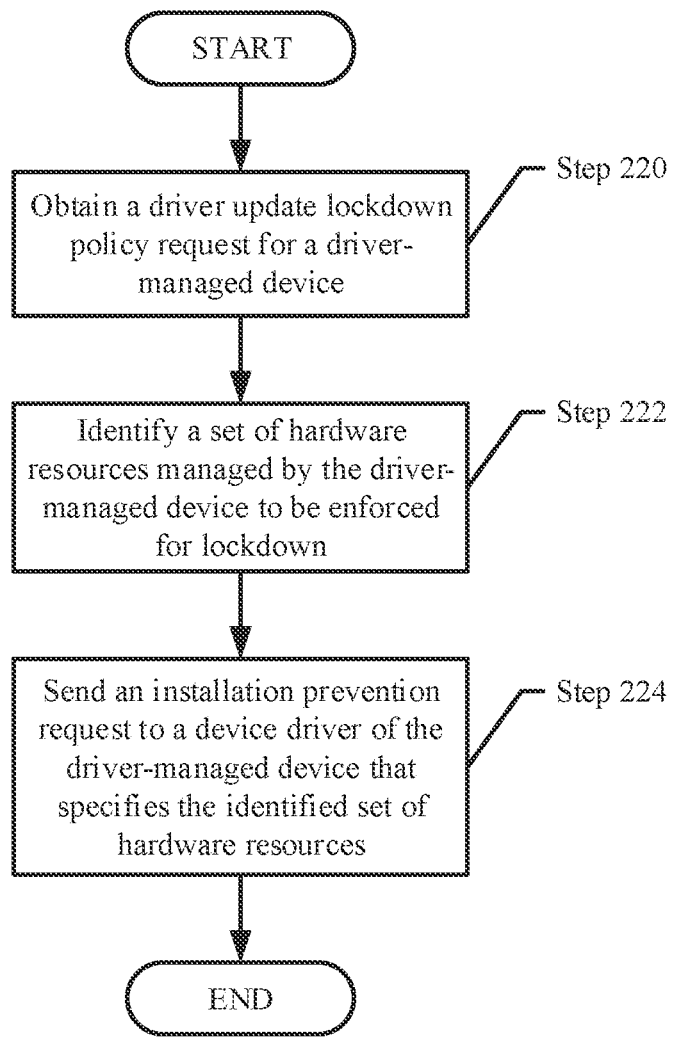
FIG. 2B shows a flowchart for managing upgrade lockdowns for driver-managed devices in accordance with one or more embodiments of the invention.

FIGS. 2A-2B show flowcharts in accordance with one or more embodiments of the invention. While the various steps in the flowcharts are presented and described sequentially, one of ordinary skill in the relevant art will appreciate that some or all of the steps may be executed in different orders, may be combined or omitted, and some or all steps may be executed in parallel. In one embodiment of the invention, the steps shown in FIGS. 2A-2B may be performed in parallel with any other steps shown in FIGS. 2A-2B without departing from the scope of the invention.

FIG. 2A shows a flowchart for managing the firmware lockdown of firmware devices in accordance with one or more embodiments of the invention. The method shown in FIG. 3A may be performed by, for example, a hardware resource manager (e.g., 100, FIG. 1A). Other components of the system illustrated in FIG. 1A may perform the method of FIG. 2A without departing from the invention.

Turning to FIG. 2A, in step 200, a firmware update lockdown request is obtained for a firmware device. In one or more embodiments of the invention, the firmware update lockdown request specifies preventing a firmware update from being automatically performed on firmware of a firmware device.

In step 202, a firmware protocol corresponding to the firmware update device is identified. In one or more embodiments of the invention, the firmware protocol is identified by communicating (e.g., sending messages to the firmware device and obtaining a response) with the firmware device and, based on a response by the firmware device, identifying the firmware protocol. As discussed above, the firmware protocol may include FMP, PLDM, and/or non-FMP. In one or more embodiments of the invention, a non-FMP protocol relates to a protocol that does not utilize the commands of the FMP protocol.

In step 204, a firmware lockdown command is generated corresponding to the identified firmware device. In one or more embodiments of the invention, the firmware lockdown command specifies updating the lockdown configuration of the firmware device to specify a lockdown mode for the firmware device.

In one or more embodiments of the invention, the content of the firmware lockdown command is based on the firmware protocol of the firmware device. For example, if the firmware device utilizes a PLDM protocol, the firmware lockdown command includes a request to obtain firmware parameters of the firmware device. As a second example, if the firmware device utilizes a FMP protocol, the firmware lockdown command specifies: (i) invoking, in the firmware device, a runtime service that is used to obtain the globally unique identifier (GUID) of the firmware device, and (ii) initiating enforcement of the lockdown mode of the firmware device using the GUID. As an additional example, if the firmware device utilizes a non-FMP protocol, the firmware lockdown command includes specifying that the firmware device be placed in a lockdown mode. The firmware lockdown command further specifies obtaining identifiers of the hardware devices of the firmware device to be locked down from future updates.

In step 206, the lockdown policies are updated to specify the firmware parameters of the firmware device to be on lockdown mode. In one or more embodiments of the invention, the lockdown policies are updated based on the firmware protocol of the firmware devices. For example, for a firmware device implementing a FMP protocol, the update to the lockdown policies includes writing a lockdown entry that specifies the GUID of the firmware device and the hardware devices of the firmware device to be locked down. As a second example, for a firmware device implementing a PLDM protocol, the obtained firmware parameters of the firmware device is specified to be in lockdown mode.

FIG. 2B shows a flowchart for managing upgrade lockdowns for driver-managed devices in accordance with one or more embodiments of the invention. The method shown in FIG. 2B may be performed by, for example, a hardware resource manager (e.g., 100, FIG. 1A). Other components of the system illustrated in FIG. 1A may perform the method of FIG. 2B without departing from the invention.

In step 220, a driver update lockdown policy request is obtained for a driver-managed device. In one or more embodiments of the invention, the driver update lockdown policy request specifies preventing the device driver from performing updates to components of the driver-managed driver. Such components may include the operating system of the device and/or any hardware resources on which the operating system is executing thereon.

In step 222, a set of hardware resources managed by the driver-managed device to be enforced for lockdown. In one or more embodiments of the invention, the hardware resources are identified by sending lockdown initiation requests to a device driver of the driver-managed device that specifies the hardware resources utilized for the operating system of the driver-managed device. The device driver may send a response that specifies such hardware resources. Alternatively, the hardware resources are identified using the driver update lockdown policy.

In step 224, an installation prevention request is sent to the device driver of the driver-managed device that specifies the identified set of hardware resources. In one or more embodiments of the invention, the installation prevention request further specifies preventing installation of future updates to the operating system.

EXAMPLE

Figure 3A:
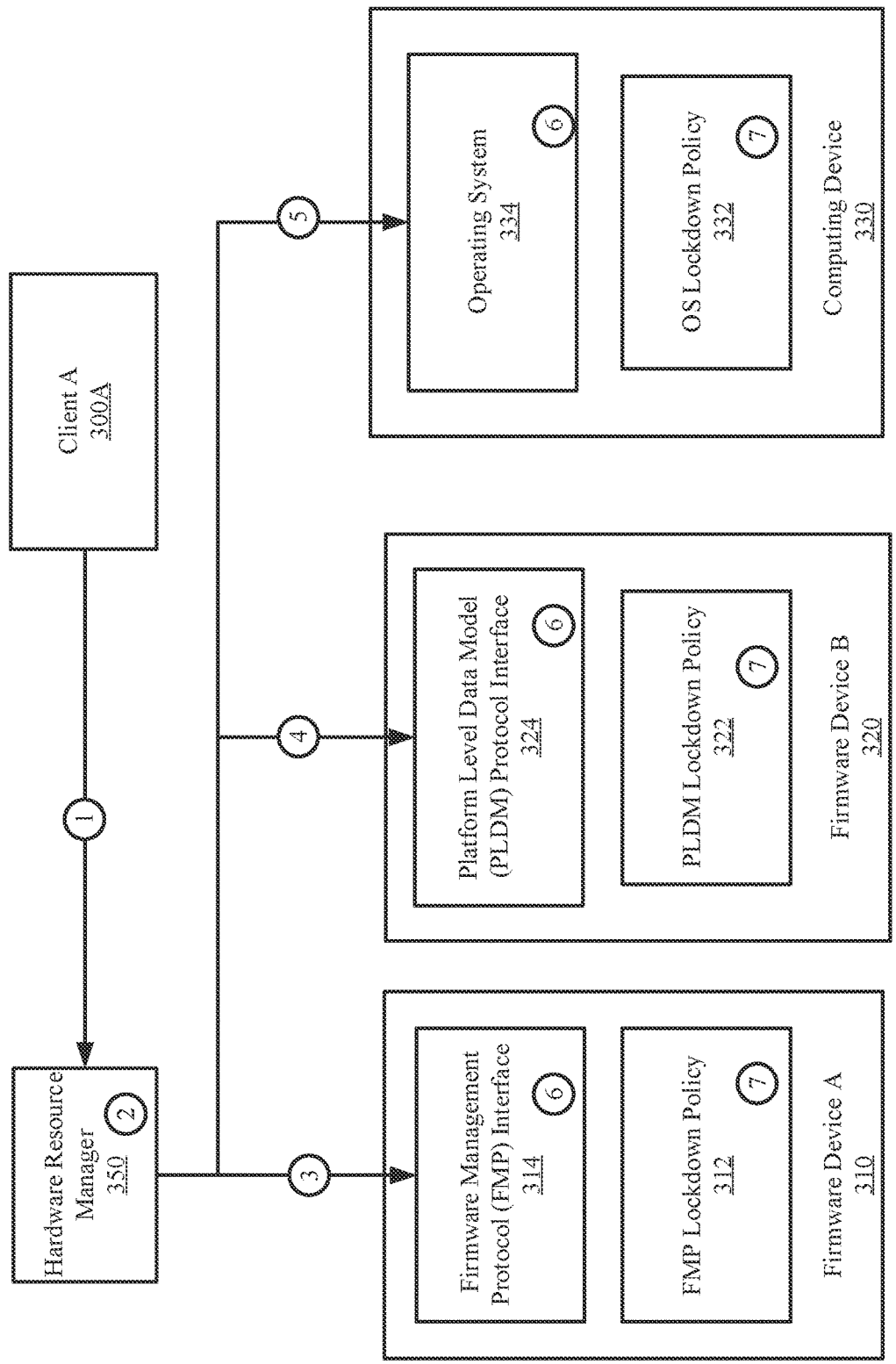
FIGS. 3A-3B show an example in accordance with one or more embodiments of the invention.
Figure 3B:
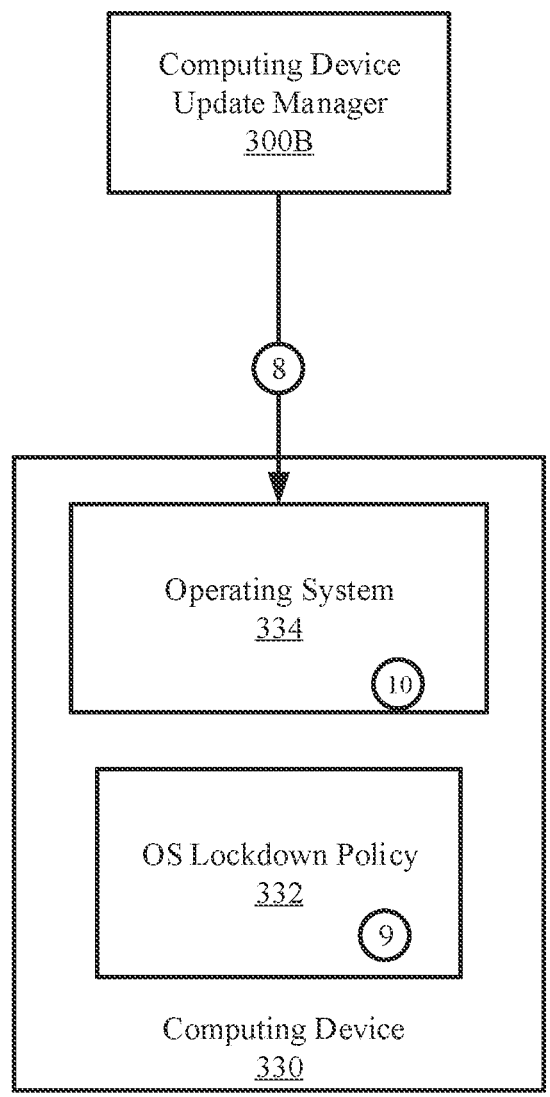

The following section describes an example. The example, illustrated in FIGS. 3A-3B, is not intended to limit the invention and is independent from any other examples discussed in this application. Turning to the example, consider a scenario in which a hardware resource manager manages the lockdown policies of three devices.

FIG. 3A includes a first diagram of an example system. For the sake of brevity, not all components of the example system are illustrated in FIG. 3A. The example system includes a hardware resource manager (350), client A (300A), two firmware devices (firmware device A (310), firmware device B (320)), and a computing device (330).

Client A (300A) is operated by an administrator that manages the updates of the three devices (310, 320, 330) managing upgrade lockdowns for driver-managed devices. Client A (300A) sends a firmware update lockdown request for each of firmware device A (310) and firmware device B (320). Further, client A sends a driver update lockdown policy request for the computing device (330) [1].

The hardware resource manager (350), in response to the firmware update lockdown requests, identifies the protocols of each of the firmware devices (310, 320). Specifically, the hardware resource device determines that firmware device A (310) communicates via a FMP protocol and that firmware device B (320) communicates via a PLDM protocol. The hardware resource manager (350) performs the method of FIG. 2A to manage the lockdown modes of firmware devices A and B (310, 320). Specifically, the hardware resource manager (350) sends a firmware lockdown command to firmware device A (310) that specifies invoking a runtime service to obtain a GUID of firmware device A (310) and that specifies updating the firmware lockdown policy (312) of firmware device A (310) to specify the lockdown mode [3]. Further, the hardware resource manager (350) sends a second firmware lockdown command to firmware device B (320) that specifies obtaining the firmware parameters of the firmware device (320) such that the obtained firmware parameters may be specified in the PLDM lockdown policy (322) of firmware device B (320) [4].

In addition to the firmware lockdown commands, the hardware resource manager (350) services a driver update lockdown policy request in accordance with FIG. 2B. Specifically, the hardware resource manager (350) sends an installation prevention request to the computing device (330) that specifies enumerating the hardware resources (not shown) of the computing device (330) to be in a lockdown mode [5].

Following the obtaining of their respective commands, the firmware devices (310, 320) and the computing device (330) each initiate a lockdown prevention [6]. Specifically, a FPM interface (314) of firmware device A (310) that obtains the first firmware lockdown command identifies the hardware resources utilized by the firmware device (310). A PLDM protocol interface (324) of firmware device B (320) identifies the firmware parameters of firmware device B (320). An operating system (334) of the computing device (330) initiates an update prevention lockdown mode. To enforce their respective lockdown prevention, each device (310, 320, 330) updates their respective lockdown policies (312, 322, 332) to specify their respective hardware resources to be in lockdown mode [7].

Turning to FIG. 3B, FIG. 3B shows a second diagram of the example system at a later point in time. At a point in time after the OS lockdown policy (332) is updated, a computing device update manager (300B) sends an OS update request to the computing device (330) [8]. The OS update request specifies updating the operating system (334) to a new version. The operating system (334) in response to receiving the OS update request, accesses the OS lockdown policy (332) to determine whether the operating system (334) is in a lockdown mode [9]. After determining, using the OS lockdown policy (332) that the OS is in a lockdown mode, the operating system (334) denies the OS update request and may send a notification to the computing device update manager (300B) that specifies the denial [10].

End of Example

As discussed above, embodiments of the invention may be implemented using computing devices. FIG. 4 shows a diagram of a computing device in accordance with one or more embodiments of the invention. The computing device (400) may include one or more computer processors (402), non-persistent storage (404) (e.g., volatile memory, such as random access memory (RAM), cache memory), persistent storage (406) (e.g., a hard disk, an optical drive such as a compact disk (CD) drive or digital versatile disk (DVD) drive, a flash memory, etc.), a communication interface (412) (e.g., Bluetooth interface, infrared interface, network interface, optical interface, etc.), input devices (410), output devices (408), and numerous other elements (not shown) and functionalities. Each of these components is described below.

In one embodiment of the invention, the computer processor(s) (402) may be an integrated circuit for processing instructions. For example, the computer processor(s) may be one or more cores or micro-cores of a processor. The computing device (400) may also include one or more input devices (410), such as a touchscreen, keyboard, mouse, microphone, touchpad, electronic pen, or any other type of input device. Further, the communication interface (412) may include an integrated circuit for connecting the computing device (400) to a network (not shown) (e.g., a local area network (LAN), a wide area network (WAN) such as the Internet, mobile network, or any other type of network) and/or to another device, such as another computing device.

In one embodiment of the invention, the computing device (400) may include one or more output devices (408), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (402), non-persistent storage (404), and persistent storage (406). Many different types of computing devices exist, and the aforementioned input and output device(s) may take other forms.

One or more embodiments of the invention may be implemented using instructions executed by one or more processors of the computing device. Further, such instructions may correspond to computer readable instructions that are stored on one or more non-transitory computer readable mediums.

One or more embodiments of the invention may improve the operation of one or more computing devices. More specifically, embodiments of the invention improve the use of firmware devices and driver-managed devices. Specifically, embodiments of the invention reduce the latency of the operation of such devices caused by an undesired update or an update automatically triggered at undesired period of time. Such latency may cause an operational delay for additional devices relying on communication with the updating devices. By preventing automatic or otherwise undesired updates to the firmware and/or operating system of the devices, embodiments of the invention allow the operation of such devices to continue.

Further, embodiments of the invention reduce the bypass of the updates from a hardware resource manager enforcing the lockdown policies of remote devices. Embodiments of the invention enable the hardware resource managers to initiate enforcement of the lockdown policies by the devices rather than relying on the hardware resource managers to perform the enforcing.

While the invention has been described above with respect to a limited number of embodiments, those skilled in the art, having the benefit of this disclosure, will appreciate that other embodiments can be devised which do not depart from the scope of the invention as disclosed herein. Accordingly, the scope of the invention should be limited only by the attached claims.

What is claimed is:

1. A method for managing a resource system, the method comprising:
   obtaining, by a hardware resource manager, a firmware update lockdown request for a lockdown for a first firmware device and a second firmware device of the resource system, wherein the hardware resource manager operates in a first computing device;
   in response to the firmware update lockdown request:
      identifying, based on first firmware operating on the first firmware device, a firmware protocol corresponding to the first firmware device, wherein the first firmware device is operatively connected to the computing device;
      identifying, based on second firmware operating on the second firmware device, a second firmware protocol corresponding to the second firmware device, wherein the computing device comprises the second firmware device;
      in parallel:
         generating a first firmware lockdown command corresponding to the first firmware device based on the first firmware protocol; and
         generating a second firmware lockdown command corresponding to the second firmware device based on the second firmware protocol;
      in parallel:
         sending, to the first firmware device, the first firmware lockdown command, wherein the first firmware device operates using a firmware management protocol (FMP), wherein the first firmware lockdown command is an FMP command that specifies updating a firmware lockdown policy of the first firmware device to specify a lockdown mode of a hardware device in the first firmware device, and wherein the first firmware device executes the first firmware lockdown command; and
         sending, to the second firmware device, the second firmware lockdown command, wherein the second firmware device operates using a platform-level data model (PLDM) protocol, wherein the second firmware lockdown command is a PLDM command that specifies obtaining firmware parameters of the second firmware device for specifying a lockdown of a hardware device in the second firmware device, and wherein the second firmware device executes the second firmware lockdown command;
      initiating updating the lockdown policies, wherein the lockdown policies are updated at the first and second devices based on the first firmware lockdown command and the second firmware lockdown command.

2. The method of claim 1, further comprising:
   obtaining, by the hardware resource manager, a driver update lockdown policy request for a driver-managed device of the resource system; in response to the driver update lockdown policy request:
   identifying a set of hardware resources managed by the driver-managed device; and initiating an installation prevention for the set of hardware resources.

3. The method of claim 2, wherein initiating the installation prevention comprises sending an installation prevention request to a device driver of the driver-managed device.

4. The method of claim 3, wherein the installation prevention request specifies preventing an operating system of the driver-managed device from automatically updating.

5. A non-transitory computer readable medium comprising computer readable program code, which when executed by a computer processor enables the computer processor to perform a method for managing a resource system, the method comprising:
   obtaining, by a hardware resource manager, a firmware update lockdown request for a lockdown for a first firmware device and a second firmware device, wherein the hardware resource manager operates in a first computing device;
   in response to the firmware update lockdown request:

identifying, based on first firmware operating on the first firmware device, a firmware protocol corresponding to the first firmware device, wherein the first firmware device is operatively connected to the computing device;

identifying, based on second firmware operating on the second firmware device, a second firmware protocol corresponding to the second firmware device, wherein the computing device comprises the second firmware device;

in parallel:
  generating a first firmware lockdown command corresponding to the first firmware device based on the first firmware protocol; and
  generating a second firmware lockdown command corresponding to the second firmware device based on the second firmware protocol;

in parallel:
  sending, to the first firmware device, the first firmware lockdown command, wherein the first firmware device operates using a firmware management protocol (FMP), wherein the first firmware lockdown command is an FMP command that specifies updating a firmware lockdown policy of the first firmware device to specify a lockdown mode of a hardware device in the first firmware device, and wherein the first firmware device executes the first firmware lockdown command; and
  sending, to the second firmware device, the second firmware lockdown command, wherein the second firmware device operates using a platform-level data model (PLDM) protocol, wherein the second firmware lockdown command is a PLDM command that specifies obtaining firmware parameters of the second firmware device for specifying a lockdown of a hardware device in the second firmware device, and wherein the second firmware device executes the second firmware lockdown command;
  initiating updating the lockdown policies, wherein the lockdown policies are updated at the first and second devices based on the first firmware lockdown command and the second firmware lockdown command.

6. The non-transitory computer readable medium of claim 5, the method further comprising:
obtaining, by the hardware resource manager, a driver update lockdown policy request for a driver-managed device;
in response to the driver update lockdown policy request:
identifying a set of hardware resources managed by the driver-managed device; and initiating an installation prevention for the set of hardware resources.

7. The non-transitory computer readable medium of claim 6, wherein initiating the installation prevention comprises sending an installation prevention request to a device driver of the driver-managed device.

8. The non-transitory computer readable medium of claim 7, wherein the installation prevention request specifies preventing an operating system of the driver-managed device from automatically updating.

9. A system comprising:
a processor; and
memory comprising instructions, which when executed by the processor, perform a method comprising:

obtaining, by a hardware resource manager, a firmware update lockdown request for a lockdown for a first firmware device and a second firmware device, wherein the hardware resource manager operates in a first computing device;

in response to the firmware update lockdown request:
identifying, based on first firmware operating on the first firmware device, a firmware protocol corresponding to the first firmware device, wherein the first firmware device is operatively connected to the computing device;

identifying, based on second firmware operating on the second firmware device, a second firmware protocol corresponding to the second firmware device, wherein the computing device comprises the second firmware device;

in parallel:
  generating a first firmware lockdown command corresponding to the first firmware device based on the first firmware protocol; and
  generating a second firmware lockdown command corresponding to the second firmware device based on the second firmware protocol;

in parallel:
  sending, to the first firmware device, the first firmware lockdown command, wherein the first firmware device operates using a firmware management protocol (FMP), wherein the first firmware lockdown command is an FMP command that specifies updating a firmware lockdown policy of the first firmware device to specify a lockdown mode of a hardware device in the first firmware device, and wherein the first firmware device executes the first firmware lockdown command;
  sending, to the second firmware device, the second firmware lockdown command, wherein the second firmware device operates using a platform-level data model (PLDM) protocol, wherein the second firmware lockdown command is a PLDM command that specifies obtaining firmware parameters of the second firmware device for specifying a lockdown of a hardware device in the second firmware device, and wherein the second firmware device executes the second firmware lockdown command;
  initiating updating the lockdown policies, wherein the lockdown policies are updated at the first and second devices based on the first firmware lockdown command and the second firmware lockdown command.

10. The system of claim 9, further comprising:
obtaining, by the hardware resource manager, a driver update lockdown policy request for a driver-managed device;
in response to the driver update lockdown policy request:
identifying a set of hardware resources managed by the driver-managed device; and initiating an installation prevention for the set of hardware resources.

11. The system of claim 10, wherein initiating the installation prevention comprises sending an installation prevention request to a device driver of the driver-managed device.

12. The system of claim 11, wherein the installation prevention request specifies preventing an operating system of the driver-managed device from automatically updating.

* * * * *